Jan. 2, 1951 E. C. HATCHER 2,536,546
VARIABLE PITCH PROPELLER
Filed Dec. 10, 1948 5 Sheets-Sheet 3
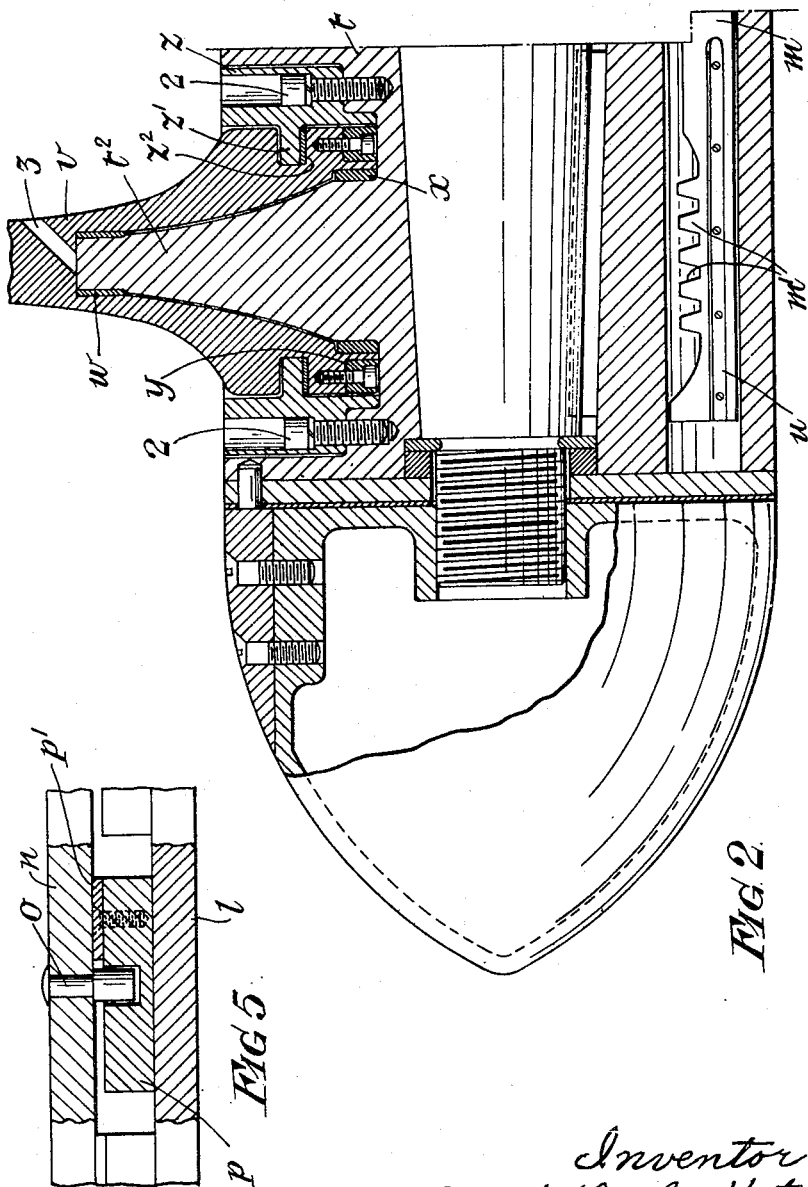
Inventor
Ernest Charles Hatcher
by Sommers & Young
Attorneys Jan. 2, 1951 E. C. HATCHER 2,536,546
VARIABLE PITCH PROPELLER
Filed Dec. 10, 1948 5 Sheets-Sheet 4

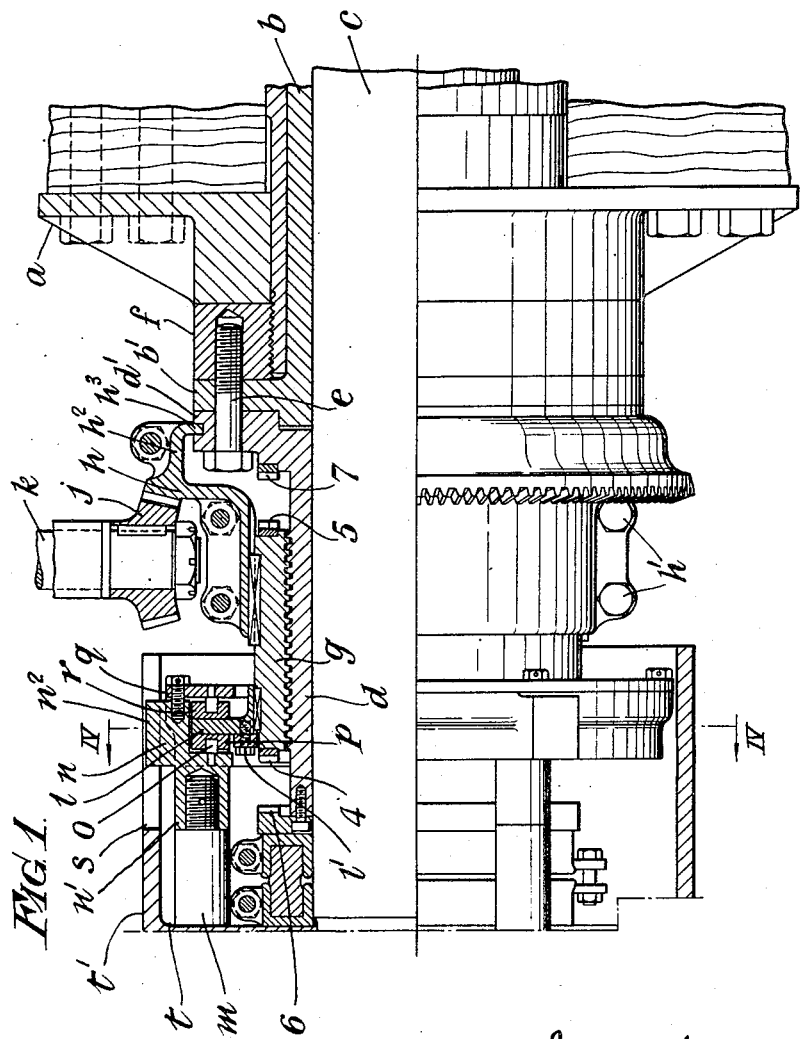

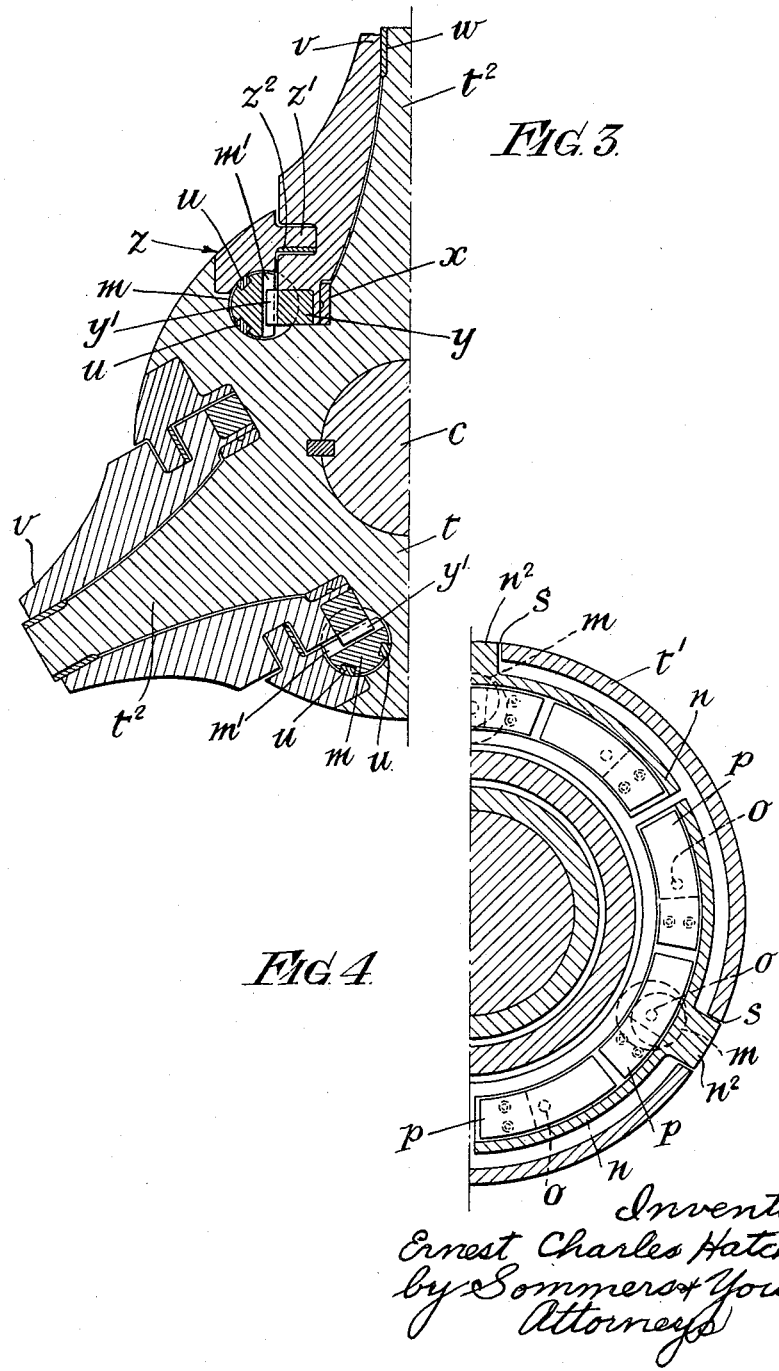

Inventor
Ernest Charles Hatcher
by Sommers & Young
Attorneys

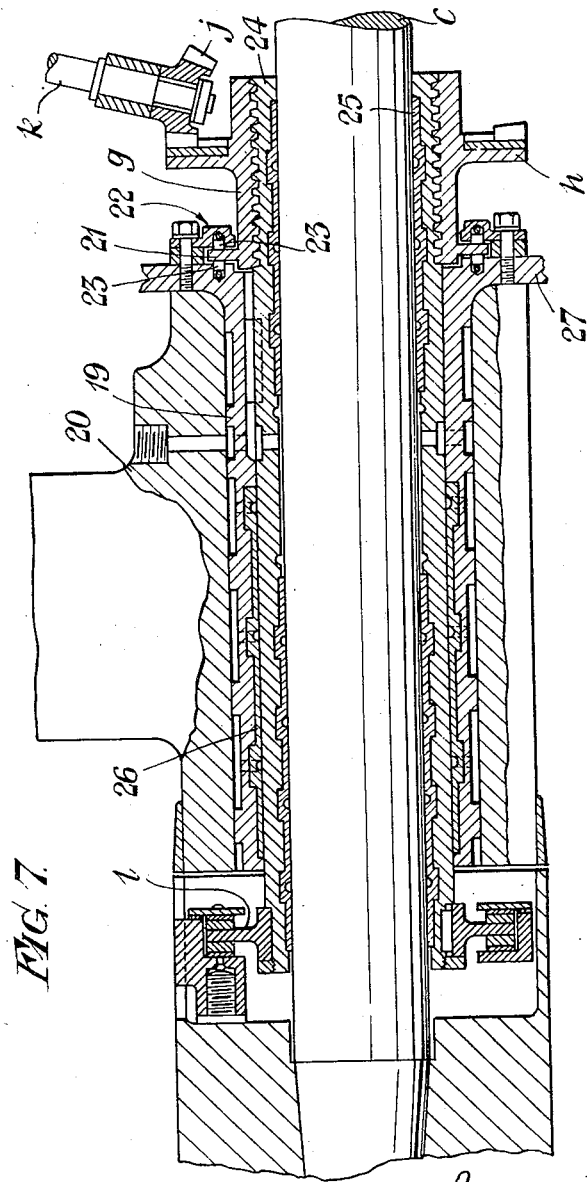

Patented Jan. 2, 1951

2,536,546

UNITED STATES PATENT OFFICE 2,536,546

VARIABLE PITCH PROPELLER

Ernest Charles Hatcher, Northwood, England, assignor to J. Stone & Company Limited, Deptford, England, a corporation of Great Britain Application December 10, 1948, Serial No. 64,628
In Great Britain December 12, 1947

3 Claims. (Cl. 170—160.43)

This invention relates to improvements in variable pitch propeller mechanism for marine purposes and particularly for submarine vessels. The principal object of the invention is to provide a simplified mechanism adapted for running reliably for long periods without attention and with no demand for oil lubrication.

The mechanism with which the invention is concerned is of the kind wherein the propeller blades are revolubly adjustable about pintles by means of rack rods meshing with toothed gears at the roots of the propeller blades, the rack rods having their forward ends coupled with a screw-operated sleeve device for moving the rack rods to and fro in order to adjust the pitch of the propeller blades.

Heretofore, the rack rods were fixedly connected at their forward end to a flange of the sleeve device, so that the said sleeve device was carried around with the propeller when revolving, a thrust coupling being provided between the forward end of the sleeve device and the operating screw.

According to the present invention each rack rod is provided with its own individual thrust coupling for engagement with the sleeve device which therefore does not revolve with the propeller, whereby there is a degree of freedom for each rack rod and greater ease and reliability of working are achieved. Advantageously, one member of the screw device is an extension of the stern tube or bracket bearing of the vessel and the other member has a flange for engaging with the individual thrust couplings of the rack rods. The thrust couplings preferably comprise rockable pads made of a synthetic plastic material, the rack rods and revolubly adjustable blades of the propeller being also provided with bearing surfaces of this material. The synthetic plastic material bearing against metal surfaces is lubricated by the water of immersion, with the result that the mechanism can be relied upon to work efficiently for long periods without requiring inspection and attention. With this improved mechanism the propeller shaft requires no modification or cutting or drilling operation when the mechanism is fitted. It is thus possible to fit the mechanism to existing vessels, the only requirement being to mount one member of the screw device as an extension of the stern tube.

In the accompanying drawing examples of mechanism in accordance with the invention are illustrated as follows:

Figure 1 is in its upper half a central longitudinal section and in the lower half a side elevation of the forward part of the mechanism.

Figure 2, which is a continuation of Figure 1, shows in its upper half a central longitudinal section through the propeller and in its lower half a section taken divergently so as to disclose a view of one of the rack rods.

Figure 3 is a transverse section taken centrally through the pintles of the propeller blades.

Figure 4 is a transverse section taken on the line IV—IV in Figure 1.

Figure 5 is a detail section, to a larger scale, illustrating the mounting of one of the thrust pads seen in Figures 1 and 4.

Figure 7 is a longitudinal section illustrating a further modification.

Figure 6:
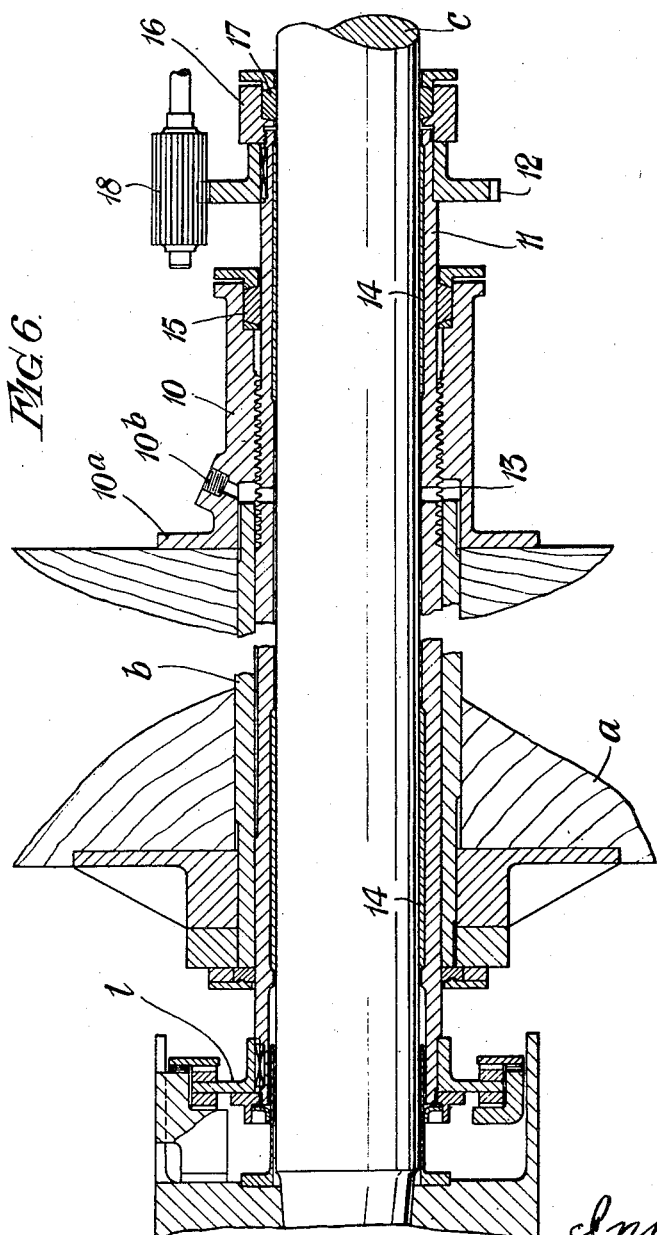
Figure 6 is a longitudinal section illustrating a modified arrangement enabling the operating mechanism to be disposed inboard, that is to say inwardly of the stern structure of a vessel.

Referring to Figure 1, $a$ is the stern structure of a vessel and $b$ is the stern tube through which passes the propeller shaft $c$. The fixed member of the screw device which is operated for varying the pitch of the propeller blades is a length of tube $d$ which is passed over the propeller shaft $c$ so that an end flange $d^1$ comes against an end flange $b^1$ of the stern tube $b$. The tube $d$ is secured by bolts $e$ which also pass through the flange $b^1$ and screw into a ring $f$ on the stern structure $a$. The tube $d$ is formed externally with a male screw thread and on to this tube $d$ there is screwed an internally screw threaded nut sleeve $g$. On the forward end of the nut sleeve $g$ there is a large bevel wheel $h$ which is prevented from turning in relation to the nut sleeve $g$ by a key or feather which nevertheless permits the nut sleeve $g$ to move axially in relation to the bevel wheel $h$. This wheel is made in halves, the two halves being put together around the nut sleeve $g$ and fastened to one another by bolts $h^1$. The wheel $h$ is formed with an annular extention $h^2$ having an inturned lip $h^3$ which engages in a groove formed in the periphery of the flange $d^1$. This engagement prevents the wheel $h$ from moving in the axial direction whilst leaving it free to revolve. A bevel pinion $j$ on a vertical shaft $k$ is in mesh with the teeth of the wheel $h$ and the shaft $k$ extends upwards to a motor or operating means within the vessel.

On the opposite end of the nut sleeve $g$ there is keyed the hub of a thrust flange $l$ and movement of this flange endwise of the sleeve $g$ is prevented by a retaining ring $l^1$. The flange $l$ forms part of a thrust coupling between the nut sleeve $g$ and three rack rods $m$, see also Figure 3, which serve for revolubly adjusting the blades of a three-bladed propeller as hereinafter explained.

Each rod $m$ is separately coupled with the flange $l$ in the following manner: The forward end of a rod $m$ is reduced in diameter and screw threaded for screwing into a boss $n^1$ projecting axially from one side of a segment $n$, and, as will be seen from Figure 4, each segment $n$ extends around a little less than 120°. As seen in Figure 1, the segments $n$ are of L-section to provide a radial wall and a peripheral wall surrounding the flange $l$. On the radial wall of each segment there are three pivots O serving for the mounting of three arcual thrust pads $p$. These pads are made from a synthetic resin with a fibrous constituent and, as seen in Figure 5, a small brass plate $p^1$ is attached by screws to the back of each pad so as to lie between the latter and the radial wall of the segment $n$, the plate $p^1$ being moreover to one side of the pivot pin O. The forward or open end of each segment $n$ is closed by an arcual plate $q$ which is bolted to the segment and which provides a second radial wall opposed to that of the segment and serving for the mounting of a second set of thrust pads $r$ in a manner similar to that above described for the pads $p$. The thrust of the nut sleeve $g$ on the rack rods $m$ is therefore transmitted in one direction by the pads $p$ and in the opposite direction by the pads $r$. The pads $p$ and $r$ are free to turn slightly about the pivot pins O and are also free to tilt slightly out of their normal plane about the edges of their respective backing plates $p^1$ and by this means the pads are at all times able to adjust themselves to the best position for transmitting the thrust. Moreover, as each rack rod $m$ has its own individual coupling with the flange $l$, free working of the rods $m$ at all times is assured. Each segment $n$ is formed at a mid-point of its periphery with a rib $n^2$ and the ribs $n^2$ fit slidably in respective slots $s$ formed in the axial direction in a hollow extension $t^1$ of the propeller boss $t$. The segments $n$ are thus carried around with the propeller although they are free to slide axially of the propeller shaft when pitch-adjusting operatons are performed.

Referring to Figures 2 and 3, it will be seen that the rack rods $m$ are slidable in bores formed in the boss $t$ of the propeller, the bores being parallel with the axis of the propeller shaft $c$. The rear end portion of each rod $m$ is formed with rack teeth $m^1$ on one side and on the opposite side each rod is formed with two grooves for the reception of bearing strips $u$ made of the synthetic resin material already referred to.

In the case of a three-bladed propeller, the boss $t$ is formed with three pintles $t^2$ for the mounting of the propeller blades $r$. The pintles $t^2$, and the corresponding recesses in the roots of the propeller blades, are somewhat conical but at the tip and root of each pintle there is a cylindrical formation these being surrounded by bearing liners in the form of sleeves $w$ and $x$ made of synthetic resin material. These sleeves provide bearings for the blades $v$ to turn around when changing pitch.

To the root of each blade $v$ there is attached by screws, as seen in Figure 2, a ring $y$ and around a segment of this ring teeth $y^1$ (Figure 3) are formed for meshing with the teeth $m^1$ of a rack rod $m$.

Referring again to Figures 2 and 3, it will be seen that around each pintle $t^2$ the boss $t$ is formed with a circular recess for the reception of the root of a blade $v$ and a blade-retaining ring $z$. The latter which is divided diametrically into two halves is formed with an inwardly projecting flange $z^1$ which engages in a recess formed around the root of the blade, the underside of each flange $z^1$ being fitted with a bearing ring $z^2$ of synthetic resin material. The two halves of the retaining ring $z$ are put together around the root of a blade $v$ with the flange parts $z^1$ engaged in the recess and the blade is then mounted upon its pintle $v$ whereupon the retaining ring $z$ is fastened to the boss $t$ of the propeller by the screws 2 seen in Figure 2. When the propeller is revolving, the blades $v$ tend to move outwards under centrifugal force but are restrained by the flanges $z^1$ of the retaining rings $z$. Thus, if the blades $v$ are turned around the pintles $t^1$ to change the pitch whilst the propeller is revolving, the rings $z^2$ provide good thrust bearings for the blades to turn against.

As will be seen in Figure 2, a hole 3 is formed in each blade $v$ from the surface thereof to the top of the recess which fits over pintle $t^2$. When the propeller revolves, the centrifugal action induces an outward flow of water through the holes 3, whereby a flow of water for lubrication purposes is caused to take place over the bearings $z^2$, $x$ and $w$. Moreover, owing to the thickness of the bearing strips $u$ on the rack rods $m$ water can pass along these rods, as will be understood from Figure 3, for the lubrication of these sliding bearings.

The operation of pitch changing is performed as follows: The shaft $k$, Figure 1, is turned in one direction or the other and the pinion $j$ imparts corresponding turning movement to the bevel gear wheel $h$ which carries with it the nut sleeve $g$. The turning of the nut sleeve $g$ causes the latter to screw itself, in one direction or the other, along the fixed and non-revoluble screw threaded tube $d$. This axial movement of the nut sleeve $g$ is imparted by the thrust flange $l$ either to the thrust pads $p$ or to the thrust pads $r$ whereby the rack rods $m$ are moved to the right hand or to the left hand in Figure 1. As will be clear from Figure 2, such movements of the rods $m$ cause the blades $v$ to turn around the pintles $t^2$ through a desired angle, owing to the meshing of the teeth $m^1$ of the rods with the teeth $y^1$ on the rings $y$ secured to the roots of the blades. When the propeller is revolving and the shaft $k$ is at rest, the rods $m$ and thrust coupling parts $n$ are revolving in relation to the flange $l$ which is not revolving. The force reacting on the blades and tending to turn them about the pintles $t^2$ is resisted by the thrust pads $p$ or $r$ bearing against the stationary flange $l$. As water is freely admitted to the thrust bearing, the pads $p$ and $r$ are constantly lubricated, so that they are in efficient working condition at all times and the resistance due to the pads rubbing against the flange $l$ is easily overcome when the flange $l$ and nut sleeve $g$ are turned by the gearing $jh$ for a pitch-changing operation.

To prevent jamming, the nut sleeve $g$ is fitted at each end with stop rings 4 and 5. When the sleeve $g$ arrives at the limit of its movement in the rearward direction, the stop ring 4 comes against a stop ring 6 fixed at the rear end of the tube $d$. When the sleeve $g$ arrives at the limit of its movement in the forward direction the stop ring 5 comes against a stop ring 7 mounted on the flange $d^1$ at the forward end of the tube $d$.

The mechanism seen in Figure 1 may be protected by enclosing it in a casing bolted to the stern strucure $a$, water being admitted to the interior of the casing through a suitable strainer.

It will be apparent that suitable changes can readily be made to suit propellers having a different number of blades.

According to the modification illustrated in Figure 6, the fixed member of the screw device is an internally screw threaded sleeve 10 extending inwardly of the vessel from the stern structure a. This sleeve 10 thus forms an inward extension of the stern tube b which is fixedly mounted in the stern structure a. The rear end of the sleeve 10 is formed with a flange 10a for bolting the sleeve 10 to the stern structure a and it is also formed with a screw threaded hole 10b for the mounting thereon of a lubricating device. On the propeller shaft c there is slidably mounted a long sleeve 11 which extends from within the vessel through the sleeve 10 and through the stern tube b. At its inner end this sleeve has keyed to it a toothed wheel 12. Over an intermediate portion of its length, the sleeve 11 is formed with a male screw thread 13 for engaging with the internal screw thread of the sleeve 10. At its rear end, the sleeve 11 is fitted with a thrust flange l similar to that described with reference to Figure 1. The internal diameter of the sleeve 11 is a little larger than the diameter of the propeller shaft c and is suitably recessed along portions of its length for the reception of liners 14 which may be of synthetic resin material. These liners 14 provide bearing surfaces between the sleeve 11 and the shaft c. A packing 15 is provided in the open end of the sleeve 10 to prevent escape of lubricant between the sleeves 10 and 11. On the inner end of the sleeve 11 there is screwed a stuffing box 16 containing a packing 17 to prevent escape of lubricant between the sleeve 11 and the shaft c. The toothed wheel 12 is in mesh with a pinion 18 and the width of the teeth of the pinion 18 is several times the width of the teeth of the wheel 12. The operation is as follows: In order to change the pitch of the propeller blades, the pinion 18 is turned to drive the toothed wheel 12 and the sleeve 11 in one direction or the other. When the sleeve 11 is turned, the screw thread 13 thereon works in the internal screw thread of the sleeve 10 and thus causes the sleeve 11 to move axially in one direction or the other. Owing to the width of the teeth of the pinion 18, the toothed wheel 12 which is fixedly mounted on the sleeve 11 can move either to the left or to the right in Figure 6 whilst still remaining in mesh with the pinion 18. The axial movements of the sleeve 11 are transmitted to the pitch-changing mechanism by means of the thrust flange l and the thrust coupling means described with reference to Figure 1. The liners 14 provide bearing surfaces for the propeller shaft c when the latter is revolving and they also serve as sliding bearing surfaces when the sleeve 11 is adjusted axially along the shaft c for pitch changing. During this operation, the sleeve 11 turns and slides axially within the stern tube b as its bearing. In this modification, the control mechanism comprising the gears 12 and 18 is entirely within the vessel.

According to the further modification illustrated in Figure 7, the control mechanism comprises an upwardly extending shaft k fitted with a bevel wheel j which is in mesh with a bevel wheel h fixedly mounted upon or formed as one piece with, a nut sleeve g, as in Figure 1. In Figure 7, however, the nut sleeve g is mounted as an extension of a stern bearing tube 19 supported by a stern bracket 20 and so that it is free to revolve but is prevented from moving axially. For this purpose, the rear end of the nut sleeve g is formed with a flange 21 which is engaged between the forward end of the bearing tube 19 and a retaining ring 22 bolted to the bearing tube 19 suitable rings 23 being inserted in the parts 19 and 21 for taking the thrust and for sealing the space between the end of the bearing tube 19 and the flange 21. The nut sleeve g works on the screw threaded end portion of a long sleeve 24 which extends through the stern bearing tube 19 and has mounted on its outer end the flange l of the thrust coupling described with reference to Figure 1. The bore of the sleeve 24 is fitted with liners 25 to serve as bearing surfaces for the propeller shaft c and the bore of the tube 19 is fitted with a liner 26 to serve as bearing surface for the long sleeve 24 which turns and slides during a pitch-changing operation. The control gearing hjk may be within the vessel if the flange part 27 is attached to the stern structure of the vessel.

I claim:
1. Pitch varying mechanism for marine propellers comprising in combination, blades pivotally mounted on pintles so as to be turnable thereabout, toothed gears at the roots of the blades, axially movable and guided rack rods meshing with said gears, screw means operative for moving said rods axially, one element of said screw means having a flange with annular faces, a segment on each of said rack rods said segments comprising radial wall portions embracing said flange on both sides, and thrust pads rockably mounted on said radial wall portions of said segments and operatively contacting against respective annular faces of said flange.

2. Pitch varying mechanism for marine propellers as claimed in claim 1, wherein the thrust pads are of synthetic resin material and rockably mounted on respective radial wall portions by the aid of pivot pins projecting from said wall portions, the said pads being fitted each with a metal back plate arranged and fixed on an end portion of a respective pad and to one side of the pivot, thereof whereby each pad is free to tilt slightly out of its normal plane and about an edge of said back plate.

3. Pitch varying mechanism for marine propellers as claimed in claim 1, wherein the propeller boss is formed with a hub extension provided with guide means parallel with the axis of the propeller shaft and each of said segments is formed with a projection slidable with guidance in said guide means.

ERNEST CHARLES HATCHER.

REFERENCES CITED

The following references are of record in the file of this patent:

UNITED STATES PATENTS

| Number | Name | Date |
| --- | --- | --- |
| 1,914,754 | Munk | June 20, 1933 |
| 2,019,965 | Havill | Nov. 5, 1935 |
| 2,172,932 | Cairns | Sept. 12, 1939 |
| 2,240,873 | Thomas | May 6, 1941 |
| 2,272,128 | Osbourne | Feb. 3, 1942 |

FOREIGN PATENTS

| Number | Country | Date |
| --- | --- | --- |
| 578,534 | Great Britain | July 2, 1946 |
| 688,367 | France | May 12, 1930 |
| 123,453 | Austria | June 25, 1931 |